(12) United States Patent
Mase

(10) Patent No.: US 6,441,626 B1
(45) Date of Patent: Aug. 27, 2002

(54) ROTARY POSITION SENSOR

(75) Inventor: Makoto Mase, Handa (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 16 days.

(21) Appl. No.: 09/691,196

(22) Filed: Oct. 19, 2000

(30) Foreign Application Priority Data

Oct. 22, 1999 (JP) ............................................. 11-301557

(51) Int. Cl.[7] .......................... G01R 27/00; H01C 10/30
(52) U.S. Cl. ........................ 324/714; 324/691; 338/160
(58) Field of Search ................................ 324/691, 713, 324/714, 723; 338/160

(56) References Cited

U.S. PATENT DOCUMENTS

| | | | |
|---|---|---|---|
| 4,646,042 A | 2/1987 | Eshelman | |
| 5,394,081 A | * 2/1995 | Ogawa et al. | 324/174 |
| 5,912,614 A | 6/1999 | Yasuda et al. | |

FOREIGN PATENT DOCUMENTS

| | | |
|---|---|---|
| DE | 195 18 340 A1 | 11/1995 |
| JP | 8-106939 | 4/1996 |
| JP | 8-285516 | 11/1996 |
| JP | 2586838 | 10/1998 |
| WO | WO 97/22847 | 6/1997 |

* cited by examiner

Primary Examiner—N. Le
Assistant Examiner—J. Kerveros
(74) Attorney, Agent, or Firm—Oliff & Berridge, PLC

(57) ABSTRACT

The present invention is directed to a rotary position sensor which includes a housing, connector terminals mounted in the housing, whose connecting portions are exposed inside of the housing, a base plate mounted in the housing, on which a detection circuit is formed, and a rotor rotated relative to the base plate. Terminal portions of the detection circuit are exposed on a surface of the base plate. The terminal portions of the detection circuit are placed to face the connecting portions of the connector terminals. And, a conductive resilient member is disposed between the terminal portions of the detection circuit and the connecting portions of the connector terminals, so that the conductive resilient member allows electrical connection only between the terminal portions of the detection circuit and the connecting portions of the connector terminals. The conductive resilient member may be formed of an anisotropy conductive rubber sheet having a plurality of conductive wires embedded therein to allow electrical connection in a perpendicular direction to the surface of the base plate, and insulate the conductive wires from each other in a parallel direction with the surface of the base plate.

5 Claims, 6 Drawing Sheets

F I G. 3
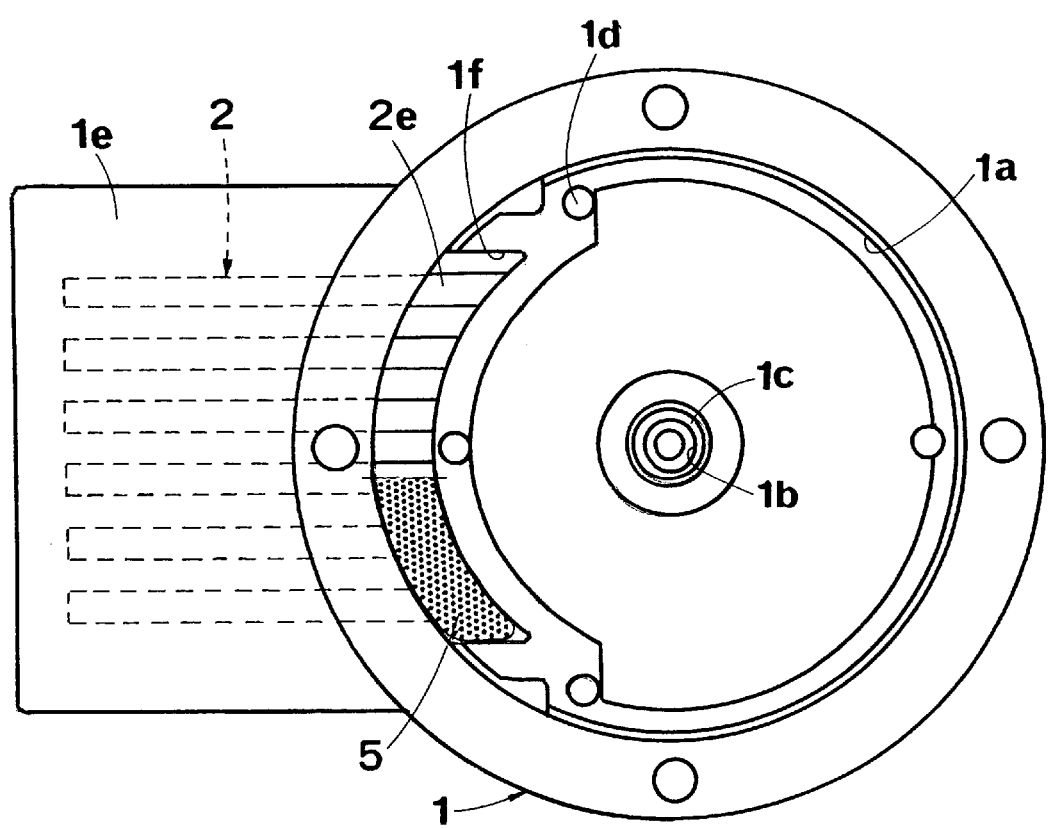

ROTARY POSITION SENSOR

BACKGROUND OF THE INVENTION

1. Field of the Invention

The present invention relates to a rotary position sensor, and more particularly, to the rotary position sensor suitable for an acceleration sensor for use in an automotive vehicle or the like.

2. Description of the Related Arts

Various types of rotary position sensors have been known heretofore, as in Japanese Utility Model No. 2586838, for example, which discloses a throttle position sensor having a base plate mounted in a housing spaced from a rotary member by a certain distance, with a detection circuit formed on a surface of the base plate, and connector terminals mounted in the housing, wherein the detection circuit is connected to the connector terminals through connecting terminals. The sensor includes a pair of engaging members formed in parallel with each other to provide a C-shaped plan view, between which end portions of the connector terminals are held and connected by resistance welding.

In Japanese Patent Laid-open Publication No. 8-285516, there is disclosed a rotating position detecting device for detecting an opening angle of a throttle valve or the like, wherein terminal plates, which correspond to the connector terminals, are fixed to a housing in a body through insert molding. Each terminal plate is made of a single plate bent by press working as shown in FIG. 2 of the Publication, and it includes an external terminal and a contact portion contacting with an end portion of a resistor circuit surface, and it is disposed in the housing under a resiliently deformed condition, to be pressed onto the end portion of the resistor circuit surface by the resilient force.

In the Utility Model No. 2586838 as described before, the throttle position sensor was proposed to improve a prior sensor which included a base plate having a detection circuit deposited thereon, whose connecting terminals were connected by resistance welding to connector terminals supported by a housing, with their surfaces mated with each other. The sensor was proposed in view of such problems that when the connecting terminals were connected to the connector terminals, the connecting surfaces of the terminals were hardly mated with each other. If one of the terminals were bent by accident, positioning of the terminals would be hardly achieved to cause a trouble in welding them, and if the terminals were welded even in that condition, tensile strength at the connected portion would be insufficient. According to the throttle position sensor proposed in the Utility Model No. 2586838, therefore, the improved sensor has been proposed. However, the base plate is connected to the connector terminals through the connecting terminals, and the resistance welding is still required. Those connecting terminals do not meet requirements for easily manufacturing and minimizing the sensor. Also, it is difficult to improve the working efficiency in manufacturing the sensor, because sputtering may cause deficiency in electrical connection between resistors of the circuit and brushes, when the connecting terminals are welded.

According to the rotating position detecting device disclosed in Japanese Patent Laid-open Publication No. 8-285516, the terminal plates are adapted to directly contact at their contact portions with the end portion of the resistor circuit surface, so that number of parts are reduced. However, the terminal plates are mounted in the housing, with the contact portions resiliently deformed, so that they are pressed onto the end portion of the resistor circuit surface by the resilient force. Therefore, it is difficult to obtain and maintain the electrical contact between the contact portions of the terminal plates and the resistor circuit surface. Furthermore, since it is required from a structural view point to provide a quite large clearance between the contact portions of the terminal plates and the resistor circuit surface, it is difficult to meet the requirement for minimizing the device.

SUMMARY OF THE INVENTION

Accordingly, it is an object of the present invention to provide a rotary position sensor having a base plate with a detection circuit formed thereon, and connector terminals mounted in a housing, with their connecting portions electrically connected to terminal portions of the detection circuit, wherein the connector terminals and the detection circuit are connected properly and easily.

In accomplishing the above and other objects, a rotary position sensor includes a housing, connector terminals mounted in the housing, whose connecting portions are exposed inside of the housing, a base plate mounted in the housing, on which a detection circuit is formed, and a rotor rotated relative to the base plate. The rotor has contacts contacting with the detection circuit and is movable relative thereto. Terminal portions of the detection circuit are exposed on a surface of the base plate, and the terminal portions of the detection circuit are placed to face the connecting portions of the connector terminals. The rotary position sensor also includes a conductive resilient member disposed between the terminal portions of the detection circuit and the connecting portions of the connector terminals, so that the conductive resilient member allows electrical connection only between the terminal portions of the detection circuit and the connecting portions of the connector terminals. The conductive resilient member is electrically conductive in a perpendicular direction to the surface of the base plate, and electrically insulating in a parallel direction to the surface of the base plate.

Preferably, the conductive resilient member includes an anisotropy conductive rubber sheet which has a plurality of conductive wires embedded therein and directed in a perpendicular direction to the surface of the base plate.

BRIEF DESCRIPTION OF THE DRAWINGS

The above stated object and following description will become readily apparent with reference to the accompanying drawings, wherein like reference numerals denote like elements, and in which:

FIG. 3 is a plan view of a bottom of a housing of a rotary position sensor according to an embodiment of the present invention;

DESCRIPTION OF THE PREFERRED EMBODIMENT

Figure 1:
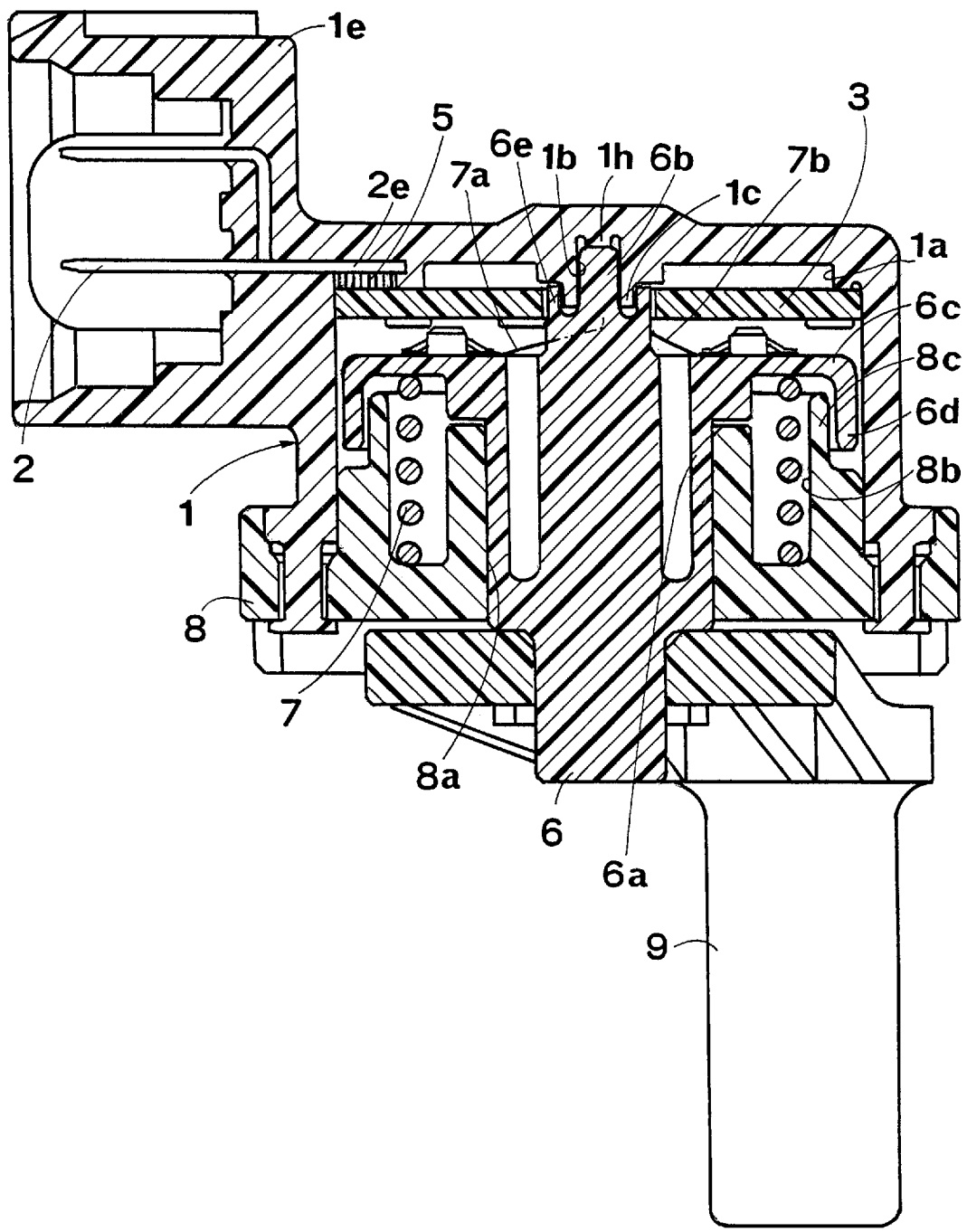
FIG. 1 is a cross sectional view of a rotary position sensor according to an embodiment of the present: invention.
Figure 2:
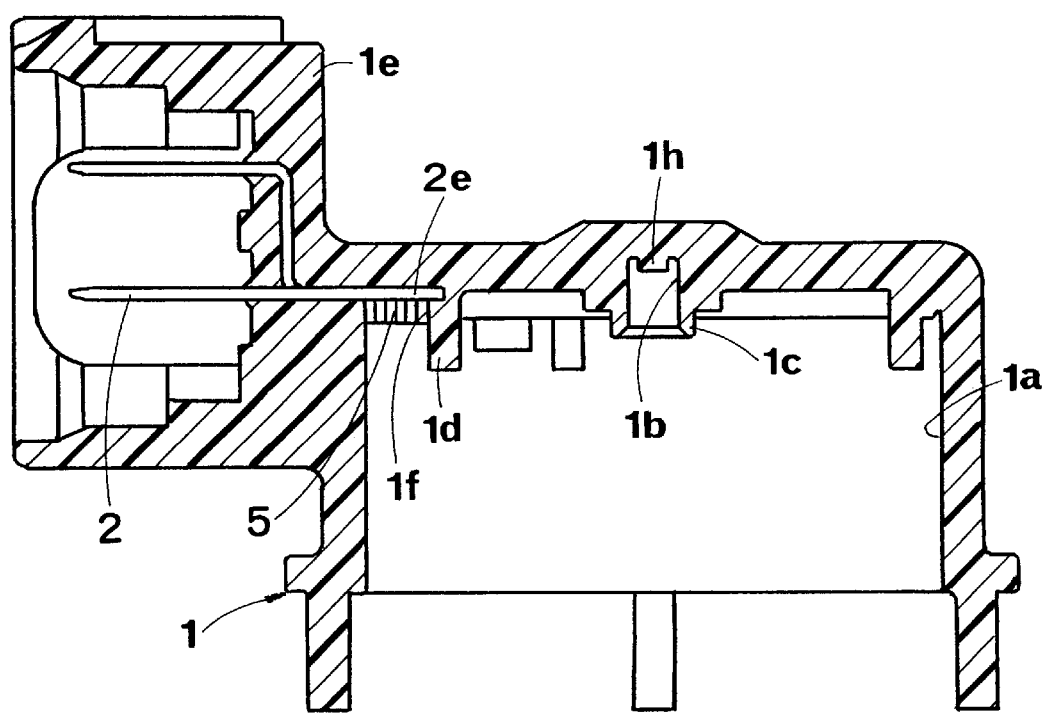
FIG. 2 is a cross sectional view of a housing of, 5 rotary position sensor according to an embodiment of the present invention.
Figure 4:
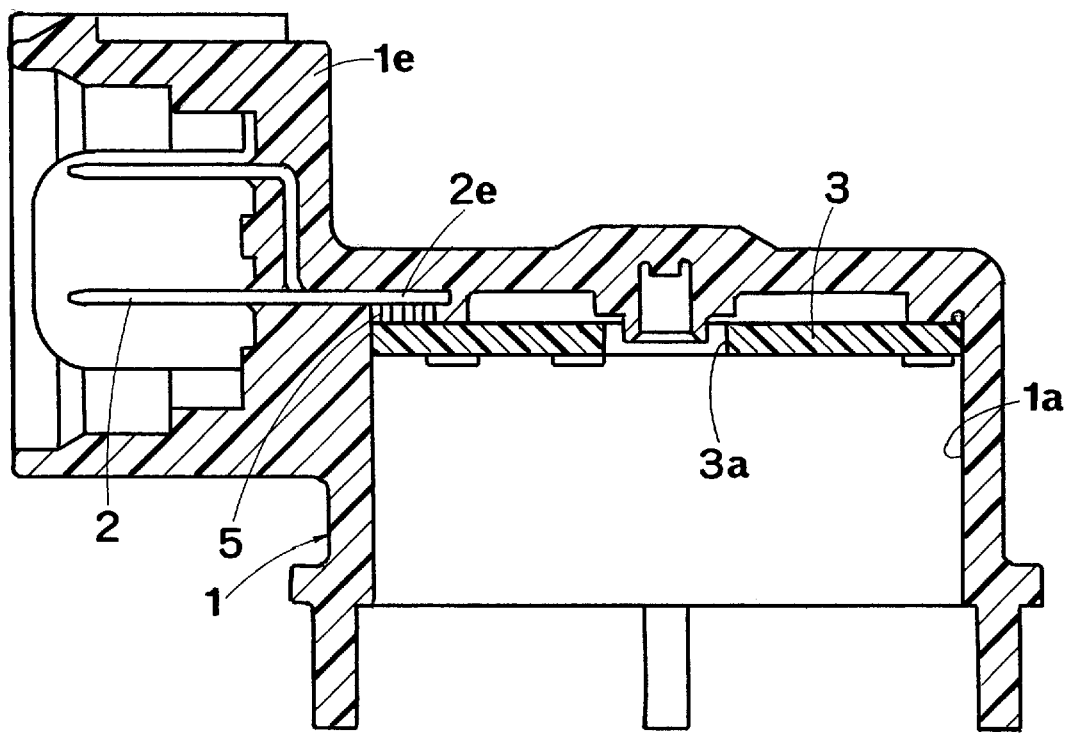
FIG. 4 is a cross sectional view of a housing assembled with a base plate and a conductive resilient member according to an embodiment of the present invention.

Referring to FIG. 1, there is illustrated a rotary position sensor according to an embodiment of the present invention, with its parts assembled according to an assembling process as described hereinafter, with reference to FIGS. 2–8. According to the present embodiment, a housing 1 is made of synthetic resin, to be formed in a shape of a bowl as shown in FIGS. 2 and 3. A base plate 3 as illustrated in FIG. 6 is mounted inside of a chamber 1a of the housing 1, and a rotor 6 is mounted inside of the housing 1 so as to be rotated relative to the base plate 3.

As shown in FIGS. 2 and 3, a bearing portion 1b is formed in the center of a bottom of the chamber 1a of the housing 1, and a circular wall portion 1c is formed around the bearing portion 1b. A plurality of bosses 1d are formed on the bottom surface in the chamber 1a of the housing 1. The housing 1 has a plurality of connector terminals 2 embedded therein through an insert forming process, and a connector portion 1e formed in a body. An arch-shaped recess 1f is formed on a peripheral portion of the bottom surface of the housing 1, and the connector terminals 2 are disposed so that their connecting portions 2e are exposed inside of the recess 1f, respectively, as shown in FIGS. 2 and 3.

Figure 5:
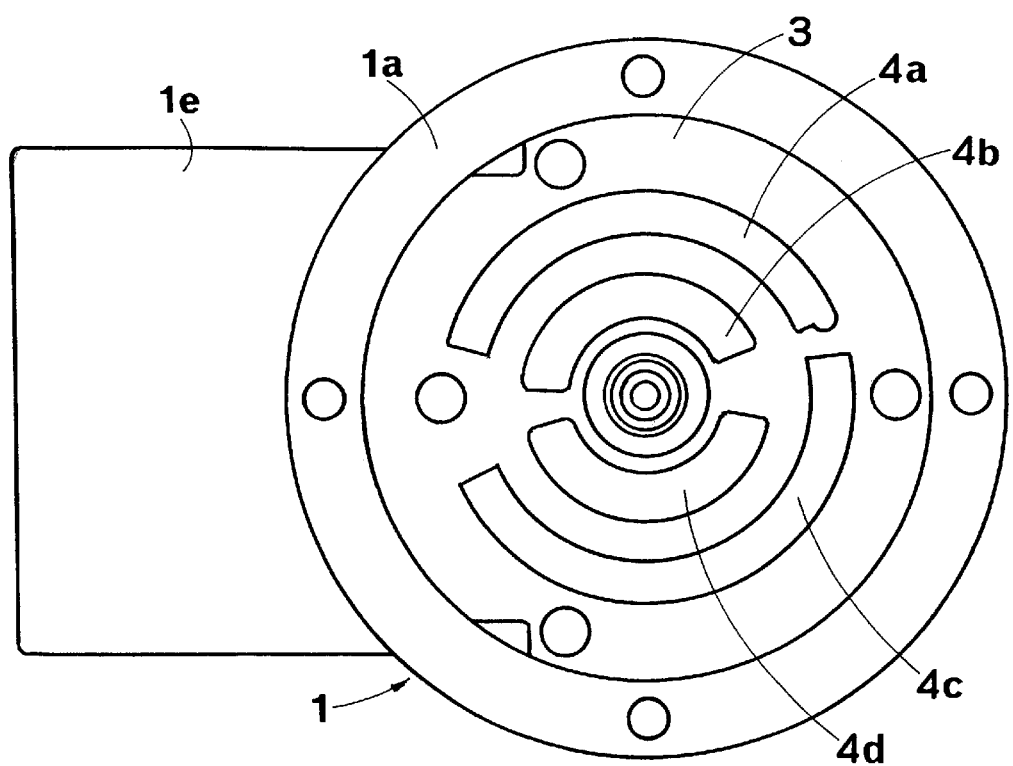
FIG. 5 is a plan view of a bottom of a housing assembled with a base plate according to an embodiment of the present invition.
Figure 6:
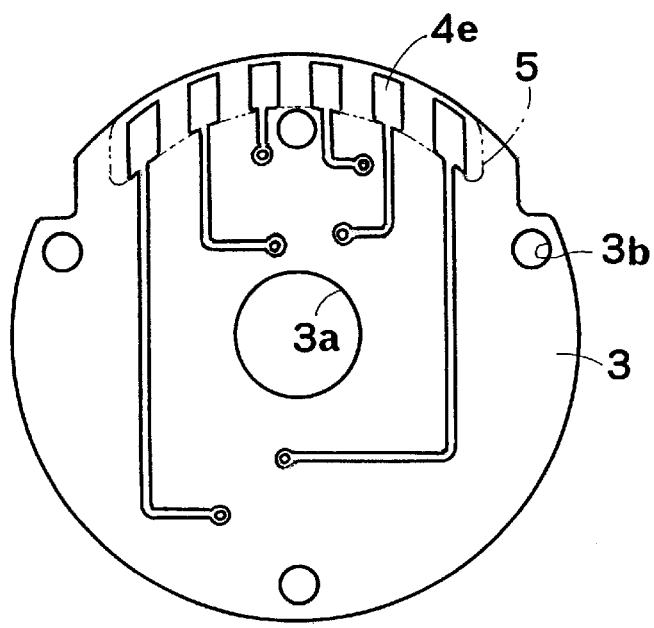
FIG. 6 is a plan view of a base plate for use in a rotary position sensor according to an embodiment of the present invention.

With respect to the base plate 3, resistors 4a–4d are formed on its front surface through a burning process, as shown in FIG. 5, while terminal portions 4e are formed on its back surface through the burning process, as shown in FIG. 6. The resistors 4a–4d are connected to the terminal portions 4e in a perpendicular direction to the back surface of the base plate 3, to provide the detection circuit according to the present invention. In an approximate center of the base plate 3, there is formed a hole 3a, around which a plurality of holes 3b are formed.

Figure 7:
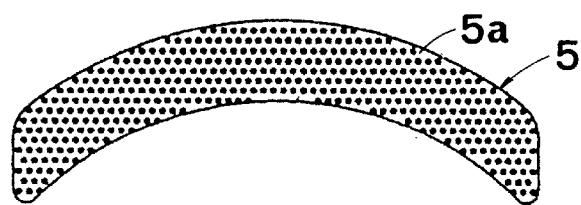
FIG. 7 is a plan view of a conductive resilient member for use in a rotary position sensor according to an embodiment of the present invention.
Figure 8:
FIG. 8 is a cross sectional view of a conductive resilient member for use in a rotary position sensor according to an embodiment of the present invention.

As shown in FIGS. 2 and 3, a conductive resilient member 5 is received in the recess 1f to contact with the connecting portions 2e of the connector terminals 2. Then, the base plate 3 is received in the housing 1, and fixed thereto by heat caulking. That is, the base plate 3 is disposed so that each boss 1d is fitted into each hole 3b, and the tip end portion of each boss 1d is heated. As a result, the conductive resilient member 5 is disposed between the connecting portions 2e of the connector terminals 2 and the terminal portions 4e. In FIG. 3, the upper half of the conductive resilient member 5 has been cut to show the connecting portions 2e. According to the present embodiment, the conductive resilient member 5 is an anisotropic conductive rubber sheet, in which a plurality of conductive wires (e.g., thin metallic wires, as indicated by 5a) are embedded, and opposite ends of which are slightly exposed. As shown in FIG. 7, the conductive resilient member 5 is formed in an arch shape. The conductive resilient member 5 is conductive through the conductive wires 5a in a perpendicular direction to its surface (i.e., between its upper surface and lower surface in FIG. 8), while the wires 5a are insulated from each other in a parallel direction to the surface of the resilient member 5. A conductive elastic connector as disclosed in Japanese Patent Laid-open Publication No. 8-106939 may be employed as the conductive resilient member 5.

After the conductive resilient member 5 and the base plate 3 are fixed inside of the housing 1, the rotor 6 is received therein, and then a flange 8 is fixed to the housing 1. The rotor 6 is a rotary member having a large diameter axial portion 6a formed on its intermediate portion, a small diameter portion 6b formed on its one end portion, and an extending portion 6c extending from the axial portion 6a, and the rotor 6 is rotatably mounted in the housing 1. The axial portion 6b is penetrated through the hole 3a defined in the approximate center of the base plate 3, and fitted into the bearing portion 1b formed in the chamber 1a, whereas the axial portion 6a is fitted into a hole 8a of the flange 8.

Around the bearing portion 1b of the housing 1, a circular wall portion 1c is formed to extend in the axial direction, and enclose the axial portion 6b of the rotor 6 fitted into the bearing portion 1b. And, the rotor 6 has a wall portion 6e which is overlapped with the wall portion 1c in a radial direction of the axial portion 6b, with a certain clearance defined against the outer peripheral surface of the wall portion 1c. A protrusion 1h is formed on the bottom surface of the bearing portion 1b, so that its end surface contacts with the end surface of the axial portion 6b of the rotor 6. The rotor 6 has a wall portion 6d formed around the periphery of the extending portion 6c, to extend downward in FIG. 1, and brushes 7a and 7b of movable contacts which are fixed to the upper surface of the extending portion 6c, as shown in FIG. 1. The brush 7a extends toward the front side in FIG. 1, while the brush 7b extends toward the back side in FIG. 1. For example, the brush 7a is disposed to press the resistors 4a and 4b as shown in FIG. 5, while the brush 7b is disposed to press the resistors 4c and 4d, so that the resistors 4a and 4b are electrically connected through the brush 7a, and the resistors 4c and 4d are electrically connected through the brush 7b.

After the axial portion 6b of the rotor 6 is fitted into the bearing portion 1b of the housing 1, and before the flange 8 is installed to support the axial portion 6a to be fitted into the hole 8a, a return spring 7 is disposed between the rotor 6 and the flange 8 to bias the rotor 6 toward a predetermined initial position. More precisely, the flange 8 has a circular groove 8b formed around the hole 8a, and the return spring 7 is received in the groove 8b. A wall portion 8c is formed at the outer peripheral side of the groove 8b, and the wall portion 8c is overlapped with the wall portion 8d of the rotor 6 in the radial direction, with a certain clearance defined between them. The flange 8 is fixed at its outer peripheral portion to the open end portion of the housing 1 by heat caulking, so that the chamber 1a of the housing 1 is tightly closed. An arm 9 is fixed to an end of the rotor 6 opposite to the axial portion 6b, and connected to an accelerator link (not shown). Therefore, in response to depression of an accelerator pedal (not shown), the arm 9 connected to the accelerator link is actuated against the biasing force of the return spring 7, so that the rotor 6 is rotated around the axial portions 6a and 6b.

According to the rotary position sensor of the present embodiment, one of the connector terminals 2 is connected to an electrical power source, and another one is connected to the earth. When the rotor 6 is rotated in response to operation of the accelerator link (not shown) through the arm 9, a predetermined voltage is applied to the resistor 4a through one of the connecting portions 2e of the connector terminals 2 and one of the terminal portions 4e. Then, a voltage signal proportional to a rotating angle of the rotor 6 is output from the connector terminals 2. According to the rotary position sensor as described above, the terminal portions 4e formed on the base plate 3 are electrically connected to the connecting portions 2e of the connector terminals 2 through the conductive resilient member 5, respectively, so that a stable connecting condition is maintained, to obtain a satisfactory liability. The aforementioned embodiment is used for detecting an operating position of the accelerator operating mechanism, but may be applied to a throttle position sensor for detecting a throttle angle and idling position.

It should be apparent to one skilled in the art that the above-described embodiments is merely illustrative Of but one of the many possible specific embodiments of the present invention. Numerous and various other arrangements can be readily devised by those skilled in the art without departing from the spirit and scope of the invention as defined in the following claims.

What is claimed is:

1. A rotary position sensor comprising:

a housing;

connector terminals mounted in said housing, connecting portions of said connector terminals being exposed inside of said housing;

a base plate mounted in said housing, said base plate having a detection circuit formed thereon, terminal portions of said detection circuit being exposed on a surface of said base plate, and the terminal portions of said detection circuit being placed to face the connecting portions of said connector terminals;

a rotor rotated relative to said base plate, said rotor having contacts contacting with said detection circuit and being movable relative thereto; and a conductive resilient member disposed between the terminal portions of said detection circuit and the connecting portions of said connector terminals, said conductive resilient member allowing electrical connection between the terminal portions of said detection circuit and the connecting portions of said connector terminals, said conductive resilient member being electrically conductive in a perpendicular direction to the surface of said base plate, and electrically insulating in a parallel direction to the surface of said base plate.

2. The rotary position sensor of claim 1, wherein said conductive resilient member includes an anisotropy conductive rubber sheet having a plurality of conductive wires embedded therein and directed in a perpendicular direction to the surface of said base plate.

3. The rotary position sensor of claim 1, wherein said housing has a recess formed therein, and the connecting portions of said connector terminals are exposed inside of said recess, and wherein said conductive resilient member is received in said recess, and held between the connecting portions of said connector terminals and said base plate.

4. The rotary position sensor of claim 3, wherein said recess of said housing is formed in an arch shape, and wherein said conductive resilient member is formed in the arch shape corresponding to the shape of said recess.

5. The rotary position sensor of claim 3, wherein said housing has a plurality of bosses formed therein, and wherein said base plate has a plurality of holes for receiving therein said bosses respectively, to fix said base plate to said housing by said bosses.

* * * * *